United States Patent
Panaite et al.

(10) Patent No.: US 12,506,425 B2
(45) Date of Patent: Dec. 23, 2025

(54) PAIRING FEATURE FOR DRIVING DC MOTORS WITH PARALLEL CAPACITORS IN OVERCURRENT RECOVERY MODE

(71) Applicant: Infineon Technologies AG, Neubiberg (DE)

(72) Inventors: Dragos Panaite, Bucharest (RO); Ansgar Pottbäcker, Grafing (DE); Minh-Duc Dang, Munich (DE); Alexandru Varlan, Piatra Neamt (RO); Daniela Burlacu, Buzau (RO)

(73) Assignee: Infineon Technologies AG, Neubiberg (DE)

( * ) Notice: Subject to any disclaimer, the term of this patent is extended or adjusted under 35 U.S.C. 154(b) by 126 days.

(21) Appl. No.: 18/394,781

(22) Filed: Dec. 22, 2023

(65) Prior Publication Data
US 2025/0211142 A1    Jun. 26, 2025

(51) Int. Cl.
*H02P 5/74* (2006.01)
*H02P 5/68* (2006.01)

(52) U.S. Cl.
CPC ...................... *H02P 5/68* (2013.01)

(58) Field of Classification Search
CPC ...... H02P 5/68; H02P 7/04; H02P 5/74; H02P 29/027
USPC ........................................................ 318/434
See application file for complete search history.

(56) References Cited

U.S. PATENT DOCUMENTS

| | | | | |
|---|---|---|---|---|
| 9,654,035 | B1* | 5/2017 | Cieslewski | H02P 27/08 |
| 2013/0241527 | A1* | 9/2013 | Russell | H02J 3/14 |
| | | | | 323/318 |
| 2019/0348833 | A1* | 11/2019 | Sun | H02M 7/219 |
| 2020/0028353 | A1* | 1/2020 | Leitner | H02M 3/156 |
| 2020/0028458 | A1* | 1/2020 | Harada | B41J 19/202 |
| 2020/0366224 | A1* | 11/2020 | Bastholm | H02P 5/46 |
| 2021/0083607 | A1* | 3/2021 | Butenhoff | H02P 27/08 |
| 2023/0231498 | A1* | 7/2023 | Shibata | B60L 3/003 |
| | | | | 318/53 |

* cited by examiner

*Primary Examiner* — Gabriel Agared
(74) *Attorney, Agent, or Firm* — Shumaker & Sieffert, P.A.

(57) ABSTRACT

Motor controller circuitry configured to operate two or more motors by driving the motors connected to output terminals of the motor controller circuitry. Each output terminal of the motor controller circuitry may connect to a driver circuit of the motor controller circuitry. Two, or more, of the motors may share an output terminal. For motors that share an output terminal, the operation of a first motor may affect the operation of other motors connected to that shared output terminal. The motor controller circuitry may store information about which output terminals may be paired, that is, which output terminals may connect to the same motor. Based on pairing information stored by the motor controller circuitry, protection circuitry of the motor controller circuitry may operate to prevent nuisance shutdown of a motor because the operation of another motor that shares the same output pin.

21 Claims, 5 Drawing Sheets

PAIRING FEATURE FOR DRIVING DC MOTORS WITH PARALLEL CAPACITORS
IN OVERCURRENT RECOVERY MODE

TECHNICAL FIELD

The disclosure relates control circuitry for driving direct current (DC) motors.

BACKGROUND

Some systems include one or more direct current (DC) motors that may perform various functions including as mechanical actuators to open and close valves, adjust the position of an object, lock and unlock an access door and similar functions. In some examples, the one or more DC motors may be controlled by circuitry that may operate the DC motors in a clock-wise or counter clock-wise direction to perform the desired function. The circuitry may include control circuitry, as well as drive circuitry to operate the DC motors.

SUMMARY

In general, the disclosure describes motor controller circuitry configured to receive a setup message. The motor controller circuitry is configured to control operation of two or more DC motors connected to at least two output terminals on the motor controller circuitry. Each output terminal connects to a respective half-bridge circuit used to drive the DC motor. The setup message may describe pairs for an output terminal with at least one other output terminal such that logic circuitry of the motor controller circuitry is aware of which output terminal is paired with the associated other output terminal of the pair.

In some examples, DC motors may have high inrush current when switching ON a half-bridge switch to apply power to the DC motor. The motor controller circuitry of this disclosure may include an overcurrent recovery mode (OCR) that measures current through the branches of each half-bridge. If the current through the branch, e.g., the low side of the half-bridge, exceeds an overcurrent/short circuit detection threshold ($I_{OC}$) then the motor controller circuitry may cycle the low side switch of the half-bridge OFF and back ON to limit the current through the half-bridge switch. Without the OCR mode, the protection circuitry of the motor controller may trip when the current exceeds the overcurrent threshold ($I_{OC}$), open the half-bridge switches cutting off current to the DC motor, and stopping operation of the DC motor.

In addition, the motor controller circuitry of this disclosure may be flexibly configured to control different arrangements of DC motors connected to the output terminals, e.g., between pairs of output terminals. In some examples, DC motors may include a motor capacitor connected in parallel to each DC motor. This motor capacitor may prevent sparks and arcing between motor brushes and commutator during motor operation, which may lead to radio-frequency (RF) emissions that may disrupt other portions of the system that uses the DC motors. An example application of such a system may include an automobile that may use several DC motors to control seat position, door locks, mirror position and other uses. The parallel motor capacitor may avoid RF emissions that may disrupt other sensing and/or processing circuitry for the automobile, such as an engine control unit (ECU), body control unit (BCU), and similar circuitry.

Cycling the half-bridge switches during the OCR mode causes the parallel motor capacitor to charge and discharge as the half-bridge switch for the DC motor turns ON and OFF. In some examples, two or more DC motors may connect between pairs of output terminals for the motor controller, e.g., the two or more DC motors may share an output terminal and the associated half-bridge for that output terminal. When the first motor is operating in steady state, and the second motor is in OCR mode, the inrush current for the second motor, along with the extra current for the charging and discharging of the motor capacitor for the second motor, may cause current through the shared half-bridge to exceed an overcurrent threshold. Protection circuitry for the shared half-bridge may trip, open both switches on the shared half-bridge, thereby stopping operation of both the first motor and the second motor.

To prevent inadvertently shutting down a DC motor caused by OCR mode, the circuitry of this disclosure the protection circuitry of the motor controller of this disclosure may apply a blanking window for a brief time ($t_{BLK}$), relative to the ON-OFF cycle time of OCR mode. During the blanking window, the protection circuitry for the motor controller of this disclosure may ignore any current spike, e.g., caused by recharging a motor capacitor during OCR mode. The protection circuitry may apply the blanking window only to a half-bridge associated with output terminals that are paired, e.g., to the shared output terminal and associated shared half-bridge for the first motor and the second motor. The setup message for motor controller circuitry may control which half-bridges that the protection circuitry applies the blanking window based on which output terminals are paired with other output terminals.

In one example, the disclosure describes controller circuit comprising: a plurality of output terminals configured to be connected to a plurality of half-bridge circuits, protection circuitry, wherein the protection circuitry is configured to be coupled to the plurality of half-bridge driver circuits, a memory configured to store pairing information that pairs a first output pin of the circuit to a second output pin output pin of the circuit, and logic circuitry configured to: control the operation of the half-bridge driver circuits, retrieve the pairing information from the memory, and based on the pairing information, configure the protection circuitry to apply a blanking window to at least one half-bridge driver circuit of the plurality of driver circuits.

In another example, the disclosure describes a system comprising: a plurality of direct current (DC) motors, a controller circuit comprising: a plurality of output terminals, wherein each output terminal of the plurality of output terminals is configured to connect to at least one DC motor of the plurality of DC motors, wherein the plurality of output terminal is configured to connect to a plurality of half-bridge driver circuits, protection circuitry, wherein the protection circuitry is configured to be coupled to the plurality of half-bridge driver circuits, a memory configured to store pairing information that pairs a first output pin of the circuit to a second output pin output pin of the circuit, and logic circuitry configured to: control the operation of the half-bridge driver circuits, retrieve the pairing information from the memory, and based on the pairing information, configure the protection circuitry to apply a blanking window to at least one half-bridge driver circuit of the plurality of driver circuits.

In another example, the disclosure describes a method comprising: controlling, by logic circuitry of a motor controller circuit, a plurality of half-bridge circuits, wherein the motor controller circuit comprises: a plurality of output terminals, wherein the plurality of output terminals is configured to connect to a plurality of half-bridge driver circuits, and protection circuitry, wherein the protection circuitry is configured to be coupled to the plurality of half-bridge driver circuits, retrieving, by the logic circuitry, pairing information from a memory, wherein the pairing information comprising information that pairs a first output pin of the circuit to a second output pin output pin of the circuit, based on the pairing information, configuring the protection circuitry to apply a blanking window to at least one half-bridge driver circuit of the plurality of driver circuits.

DETAILED DESCRIPTION

The disclosure describes motor controller circuitry configured to operate two or more motors, e.g., DC motors by driving the motors connected to output terminals of the motor controller circuitry. Each output terminal of the motor controller circuitry may connect to a driver circuit of the motor controller circuitry, such as a half-bridge circuit. In some examples, two, or more, of the motors may share an output terminal. For motors that share an output terminal, the operation of a first motor may affect the operation of other motors connected to that shared output terminal. The motor controller circuitry may store information about which output terminals may be paired, that is, which output terminals may connect to the same motor of the two or more motors. The stored information may also include which output terminals may be paired with two or more output terminals, e.g., which output terminals may be shared by two or more motors.

Based on pairing information stored by the motor controller circuitry, protection circuitry of the motor controller circuitry may operate to both protect the motor controller circuitry from over current, and other faults as well as operate to prevent nuisance shutdown of a motor because the operation of another motor that share the same output pin. Because the motor controller circuitry of this disclosure may be flexibly configured to drive and operate the two or more motors in many different configurations, depending on the application, the stored pairing information may differ between motor controller circuits based on how the different motors connect to the output terminals of motor controller circuitry.

Figure 1:
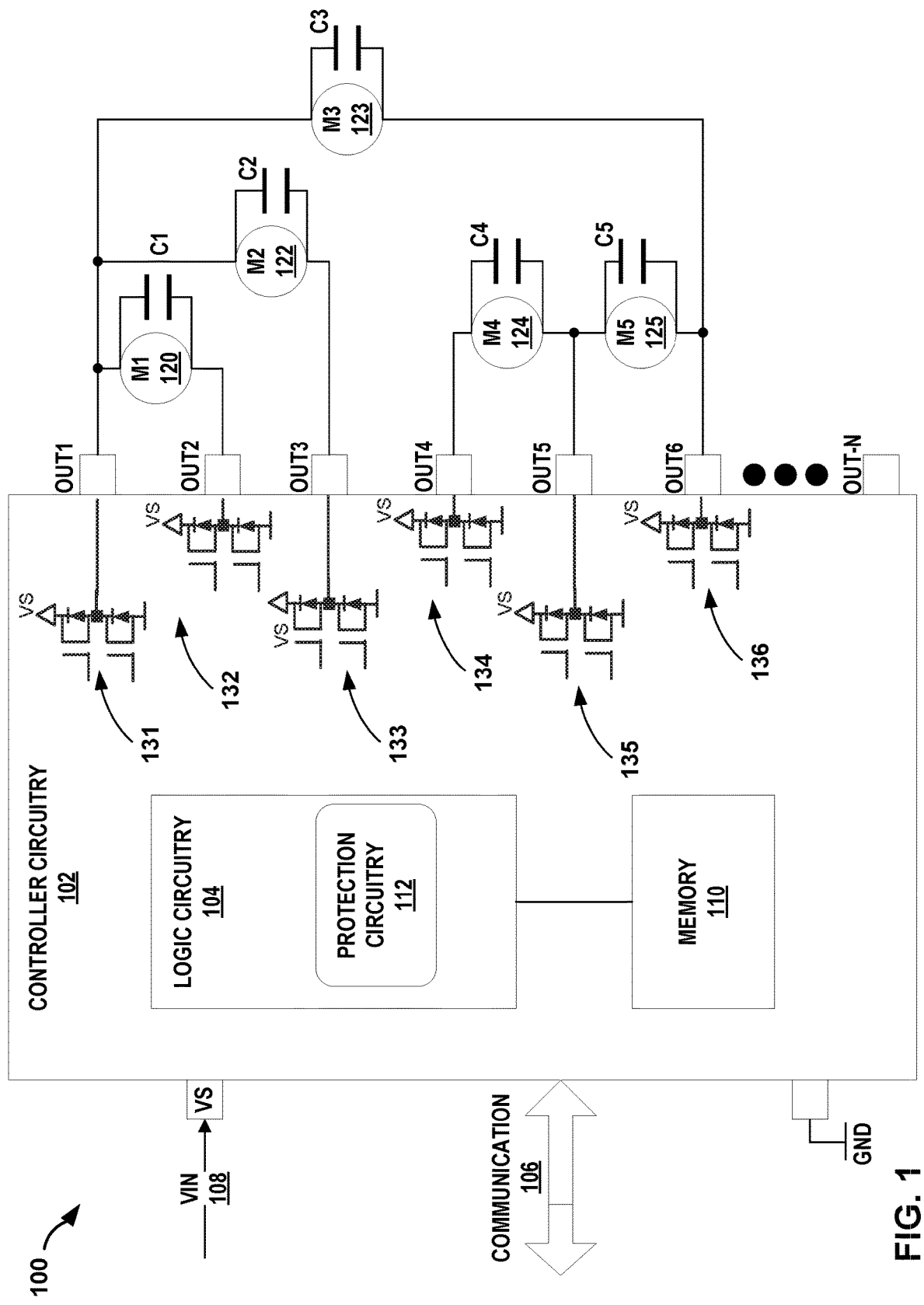
FIG. 1 is a block diagram illustrating an example system for controlling one or more DC motors according to one or more techniques of this disclosure.

FIG. 1 is a block diagram illustrating an example system for controlling one or more DC motors according to one or more techniques of this disclosure. System 100 includes controller circuitry 102 and a plurality of motors. Controller circuitry 102 may control the operation of the motors of system 100 and may also be referred to as motor controller circuitry.

In the example of FIG. 1, controller circuitry 102 includes N output terminals, e.g., OUT1, OUT2, OUT3, OUT4, OUT5, OUT6 through OUT-N. Each output terminal connects to a driver circuit, which in the example of FIG. 1 comprises half-bridge circuits. For controller circuitry 102, half-bridge 131 connects to OUT1, half-bridge 132 connects to OUT2, half-bridge 133 connects to OUT3, half-bridge 134 connects to OUT4, half-bridge 135 connects to OUT5, and half-bridge 136 connects to OUT6. Although not shown in FIG. 1, other output terminals between OUT 6 and OUT-N may also connect to similar driver circuits. Each half-bridge circuit connected to the respective output terminal is configured to drive operation of the DC motor to which it is connected.

Controller circuitry 102 also includes logic circuitry 104, protection circuitry 112, and memory 110, as well as other connection terminals. Controller circuitry 102 may receive input power, Vin 108 at terminal VS and connect to circuit ground at terminal GND. Controller circuitry 102 may include one or more connection terminals for communication 106. For example, communication 106 may include any of several communication schemes, such as serial peripheral interface (SPI), CAN, universal serial bus (USB) and other types of communication.

Note that the components of controller circuitry 102 in the example of FIG. 1 is just one possible arrangement and used to explain the operation of the motor controller circuitry of this disclosure. In other examples, protection circuitry 112 may be separate from logic circuitry 104 and connected to logic circuitry 104 to operate functions of the components, e.g., driver circuits 131-136. In other examples, controller circuitry 102 may have more or fewer components than shown in the example of FIG. 1, but still perform the operations described in this disclosure.

Controller 102 may be flexibly configured to drive motors arranged in a variety of configurations. The motor arrangement for the example of FIG. 1 is just one possible example arrangement. In the example of FIG. 1, motor M1 120 connects between output terminals OUT1 and OUT2, motor M2 122 connects between output terminals OUT1 and OUT3. As described above, for motor M1 120, output terminals OUT1 and OUT2 are paired, for motor M2 122, output terminals OUT1 and OUT3 are paired and motor M1 120 and motor M2 122 share output terminal OUT1. Similarly motor M3 123 connects between OUT1 and OUT6, motor M4 124 connects between OUT4 and OUT5 and motor M5 125 connects between OUT5 and OUT6.

Controller circuitry 102 may store the pairing information at memory 110. In some examples, the pairing information may be stored as pairing bits. For example, pairing bits for some options for output terminal OUT1 may include pairing bits as listed in the table below. Memory 110 may store pairing bits for each output terminal similar to that shown below for OUT1. The pairing information stored in memory 110 may control how protection circuitry 112 functions for each output terminal.

| Pairing Bits | Pairing description | Notes |
| --- | --- | --- |
| 000 | No pair | Not shown in FIG. 1 |
| 001 | OUT1 paired with OUT2 | Not shown in FIG. 1 |
| 010 | OUT1 paired with OUT3 | Not shown in FIG. 1 |

-continued

| Pairing Bits | Pairing description | Notes |
|---|---|---|
| 011 | OUT1 paired with OUT2 and OUT3 | Not shown in FIG. 1 |
| 100 | OUT1 paired with OUT6 | Not shown in FIG. 1 |
| 101 | OUT1 paired with OUT2 and OUT6 | Not shown in FIG. 1 |
| 110 | OUT1 paired with OUT3 and OUT6 | Not shown in FIG. 1 |
| 111 | OUT1 paired with OUT2, OUT3 and OUT6 | FIG. 1 |

The motors of system 100 are all direct current (DC) motors. During DC motor operation, sparks events between brushes and the commutator may lead to high levels of radio frequency (RF) emissions, which may interfere with other circuitry of system 100. To reduce or minimize RF emissions the motors of system 100 may include a motor capacitor connected in parallel with the motor terminals and from the motor terminals to the case of the motor. In the example of FIG. 1, capacitor C1 connects across motor M1 120, capacitor C2 connects across motor M2 122, capacitor C3 connects across motor M3 123, capacitor C4 connects across motor M4 124, and capacitor C5 connects across motor M5 125.

DC motors may draw a high in-rush current when starting up. For example, if motor M1 120 is stopped and logic circuitry 104 receives a command to operate motor M1 120, then motor M1 120 may draw a high magnitude electrical current during start up. This high magnitude current may exceed a maximum current threshold, which may also be known as an overcurrent threshold. When the current through an output terminal of controller circuitry 102 exceeds the overcurrent threshold, then protection circuitry 112 may shut down the driver circuit to protect controller circuitry 102, which will stop the motor.

However, controller circuitry 102 may operate in OCR mode when starting up a motor. Motor controller circuitry 102 of this disclosure may include an overcurrent recovery mode (OCR) that measures current through the branches of each half-bridge. If the current through the branch, e.g., the low side of the half-bridge, exceeds an overcurrent/short circuit detection threshold ($I_{OC}$) then the motor controller circuitry may cycle the low side switch of the half-bridge OFF and back ON to limit the current through the half-bridge switch that is indicating a high current. In some examples, protection circuitry 112 executes the OCR mode, e.g., monitoring the current and cycling switches of the driver circuits as needed to ensure the current does not exceed the overcurrent threshold that would cause a shut-down of a motor while the motor starts up.

As described above, and shown in the example of FIG. 1, each motor 120-125 also includes a motor capacitor. The motor capacitor connected in parallel with the motor terminals, during OCR mode, is discharged at the beginning of the overcurrent recovery OFF duration ($t_{OCR\_OFF}$), which occurs while a switch of the driver circuit indicating a high current during startup is switched OFF, e.g., by protection circuitry 112. Once the $t_{OCR\_OFF}$ duration elapsed, and protection circuitry 112 switches ON the switch, discharged capacitor connected between the half bridge outputs will to be charged again to the initial voltage value, e.g., the voltage value before $t_{OCR\_OFF}$ starts. The electric current value which recharges the capacitor is defined by the electric current difference value between current limitation of the transistor belonging to half bridge which is performing the over current recovery function and current which is flowing through the motor. The current limitation of the transistor may depend on characteristics of the transistor selected for use as a switch in the driver circuit. This electric current value that recharges the motor capacitor may exceed the overcurrent/short circuit threshold set within protection circuitry 112 and may cause protection circuitry 112 to trip and shut down the driver circuit, which would stop the motor. This capacitor recharge current may be considered a current spike, because the electric current may be high for a short duration relative to other durations for operation of controller circuitry 102. This current spike may pass through the transistor being cycled OFF and ON during OCR mode, e.g., after $t_{OCR\_OFF}$ duration elapsed and protection circuitry 112 turns the transistor back ON. The electrical current spike may also pass through another half bridge circuit connected to the same motor, e.g., a transistor of the other half bridge which is remains in the ON state during $t_{OCR\_OFF}$ of the transistor being cycled ON and OFF during OCR mode.

As one specific example, when motor M4 124 is operation, the driver circuits connected to OUT4 and OUT5, driver circuits 134 and 135 respectively, may have transistors that are in the ON state to cause motor M4 124 to operate in a selected direction. While motor M4 124 is operating, logic circuitry 104 may receive a communication to start up motor M5 125. The high inrush current for motor M5 125 may cause protection circuitry 112 to cycle one of the switches of driver circuit 136, connected to OUT6, ON and OFF in OCR mode. Each time protection circuitry 112 cycles the switch OFF, motor capacitor C5 may discharge. Each time protection circuitry 112 cycles the switch of driver circuit 136 back ON in OCR mode, a current spike for the recharge current for motor capacitor C5 may pass through the switch of driver circuit 136, but also through OUT 5 and through the associated driver circuit 135, which still has a switch that remains ON to keep motor M4 124 running. This current spike may trip the overcurrent threshold of driver circuit 135, protection circuitry 112 may shut down driver circuit 135, which would stop operation of both motor M4 124 and motor M5 125.

To prevent unnecessary shutdown of motors caused by the motor capacitor recharge spike, logic circuitry 104, which controls the operation of the half-bridge driver circuits 131-136, may retrieve the pairing information from the memory 110. Based on the pairing information, logic circuitry 104 may configure protection circuitry 112 to apply a blanking window to at least one half-bridge driver circuit. For the example described above, memory 110 may store pairing information showing that OUT5 is paired with both OUT4 and OUT6. While motor M4 124 is running and motor M5 125 starts up, causing driver circuit 136 for OUT6 to enter OCR mode, then protection circuitry 112 may apply a blanking time, e.g., a blanking duration, during which protection circuitry 112 may ignore any current spike through the driver circuits of the paired output terminals. Protection circuitry 112 may apply this blanking duration ($t_{BLK\_OCOL3}$) to both the transistors which remain ON during $t_{OCR\_OFF}$ and for the transistor which starts again in ON state when $t_{OCR\_OFF}$ ends. In the example above, protection circuitry 112 may apply the blanking duration ($t_{BLK\_OCOL3}$), also referred to as a blanking period or blanking window, to at least OUT5 and OUT 6 while OUT6 is operating in OCR mode. In this manner, the pairing information stored in memory 110 may control how protection circuitry 112 functions for each output terminal. The current spike ignored during the blanking time, may short enough not to cause damage. A current spike with a longer duration current would exceed the blanking time and trip the overcurrent threshold of protection circuitry 112. Also, although described in terms of OUT4, OUT5, and OUT6, the above steps of operating in OCR mode and applying blanking windows to designated pairs of output terminals may occur at different times, or at the same time, depending on the operation of the motors connected to the other output terminals of controller circuitry 102.

Controller circuitry 102 may be desirable for a variety to applications that may use DC motors. One possible application for the arrangement of FIG. 1 may include to control DC motors used for an automobile. For example, M1 120 and M2 122 may adjust the side mirrors on an automobile while M3 123 folds the side mirrors when parked. Other output terminals for controller circuitry 102 may operate other motors in a vehicle, such as motors used to adjust seat position.

The arrangement of motors, and which output terminals are paired with other output terminals may differ from application to application, e.g., between a first model automobile and a second model automobile. Other processing circuitry that is part of the larger system to which system 100 connects (not shown in FIG. 4) may communicate with controller circuitry 102, e.g., via connection terminals for communication 106. Logic circuitry 104 may receive a setup message from the processing circuitry outside controller circuitry 102. The setup message may include at least pairing information that pairs a first output pin of the circuit to a second output pin output pin of the circuit. The same, or subsequent setup messages, may also include all the pairing information based on the arrangement of motors connected to the output terminals for controller circuitry 102 including any shared output terminals. Logic circuitry 104 may store the pairing information at memory 110. Protection circuitry 112 may apply blanking windows based on the pairing information stored at memory 110 during circuit operation.

Figure 2:
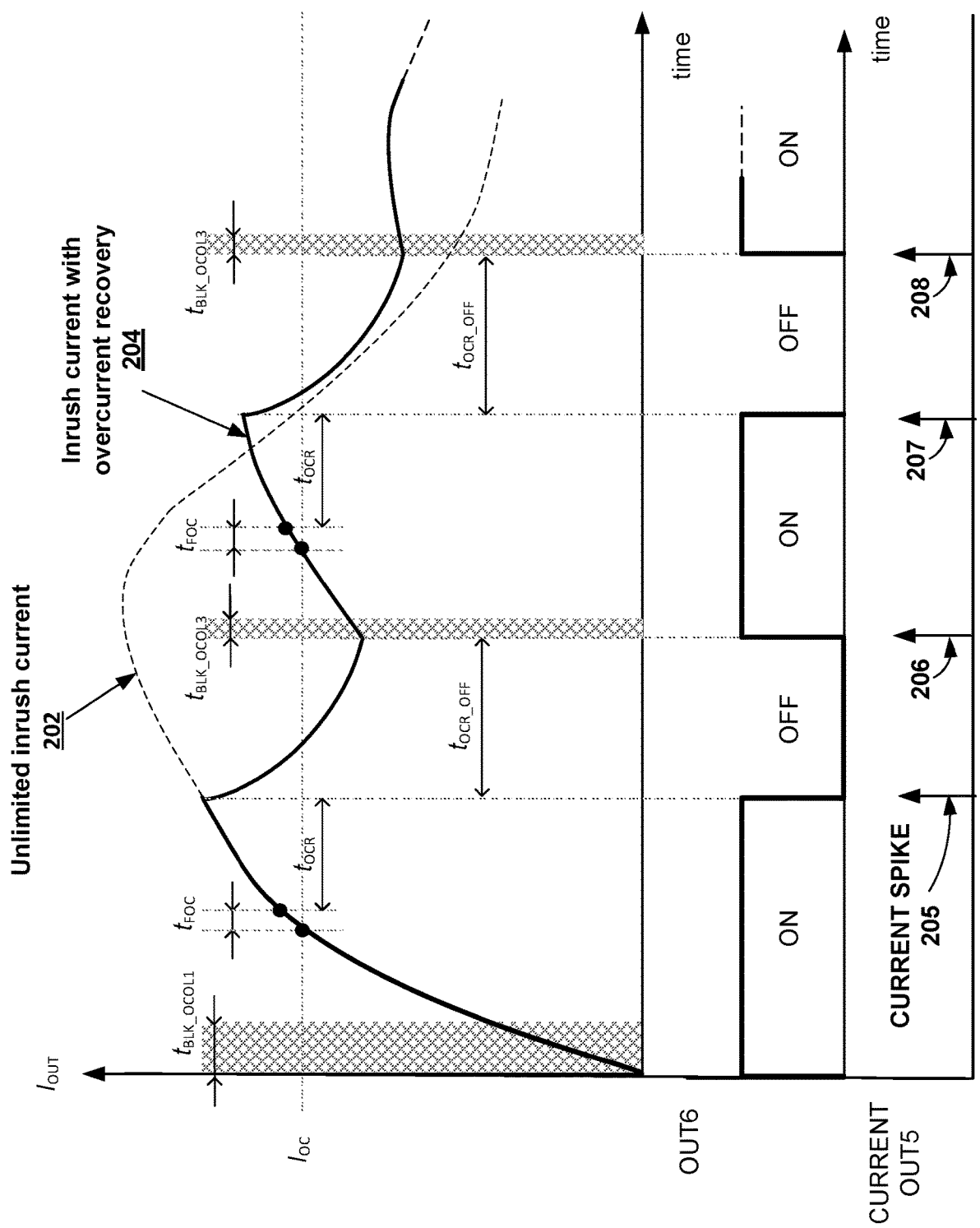
FIG. 2 is a time graph illustrating an example operation of the overcurrent recovery mode of the motor controller circuit of this disclosure.

FIG. 2 is a time graph illustrating an example operation of the overcurrent recovery mode of the motor controller circuit of this disclosure. The example of FIG. 2 will be described in terms of the example described above in relation to FIG. 1 for OUT4, OUT5, OUT6 and motors M4 124 and M5 125. At the beginning of the time graph, motor M4 124 is operating, so a switch for driver circuit 135 connected to OUT 5 is ON. Also motor M5 125 just begins to start up.

Protection circuitry 112 may apply a blanking window, $t_{BLK\_OCOL1}$ to driver circuit 136 connect to OUT6 to ignore a possible initial current spike when starting M5 125. Without OCR mode, the inrush current to motor M5 125 may not be limited (202) and possibly exceed an overcurrent threshold causing protection circuitry 112 to shut off current through OUT6. However, when operating in OCR mode during motor startup, protection circuitry 112 may cycle at least one switch connected to OUT6 when protection circuitry 112 detects the motor current exceeds a current threshold, e.g., $I_{OC}$.

As described above in relation to FIG. 1, turning ON and OFF the switch for driver circuit 136, shown in FIG. 1, for OUT 6 may reduce the inrush current (204). However, the motor capacitor connected in parallel with the motor terminals, during overcurrent recovery mode, is discharged at the beginning of the overcurrent recovery OFF time ($t_{OCR\_OFF}$). Once the $t_{OCR\_OFF}$ elapsed the discharged capacitor connected between the half bridge outputs charges again to the initial voltage value (e.g., the voltage value before $t_{OCR\_OFF}$ starts, not shown in FIG. 2). This current value that recharges the motor capacitor may include a current spike, e.g., current spike 206 and 208, that may exceed the overcurrent/short circuit threshold for the both the transistor which is in the ON state during $t_{OCR\_OFF}$ e.g., connected to OUT 5, and/or for the transistor which starts again in ON state after $t_{OCR\_OFF}$ elapsed, connected to OUT6. Therefore the circuitry of this disclosure may apply a blanking window, $t_{BLK\_OCOL3}$, to both driver circuits for OUT5 and OUT6.

Similarly, when the switch that is being cycled in OCR mode turns OFF, e.g., at the end of $t_{OCR}$, may also cause a current spike, current spikes 205 and 207, that may affect other paired driver circuits, especially for a switch that remains ON, during the cycling. Therefore, the circuitry of this disclosure also applies a blanking window, $t_{BLK\_OCOL3}$, to a paired switch that remains ON. In the example of FIG. 2, when OUT6 switches OFF, generates current spikes 205 and 207, and the circuitry of this disclosure applies a blanking window to the switch for OUT5 that remains ON. Note that this blanking window is not shown in the example of FIG. 2.

Protection circuitry 112 may apply the blanking window, $t_{BLK\_OCOL3}$, to the output terminal driver circuit that is being operated in OCR mode. The pairing information, e.g., stored in memory 110, shown in FIG. 1, determines which other output terminals and associated driver circuits that protection circuitry 112 should apply the blanking window, $t_{BLK\_OCOL3}$. In other words, based on the pairing information, protection circuitry 112 may apply the blanking window, $t_{BLK\_OCOL3}$, to at least one half-bridge driver circuit of the driver circuits other than the driver circuit being operated using OCR mode. While operating in OCR mode, protection circuitry 112 is configured to turn OFF and ON at least one switch of a first half-bridge driver circuit, e.g., driver circuit 136 and configured to start the blanking window after turning ON the switch during OCR mode.

In some examples, protection circuitry 112 may apply the blanking window to start simultaneously with turning ON the at least one switch during OCR mode. In other examples, protection circuitry 112 may start the blanking window after a delay of a few microseconds or milliseconds.

Figure 3:
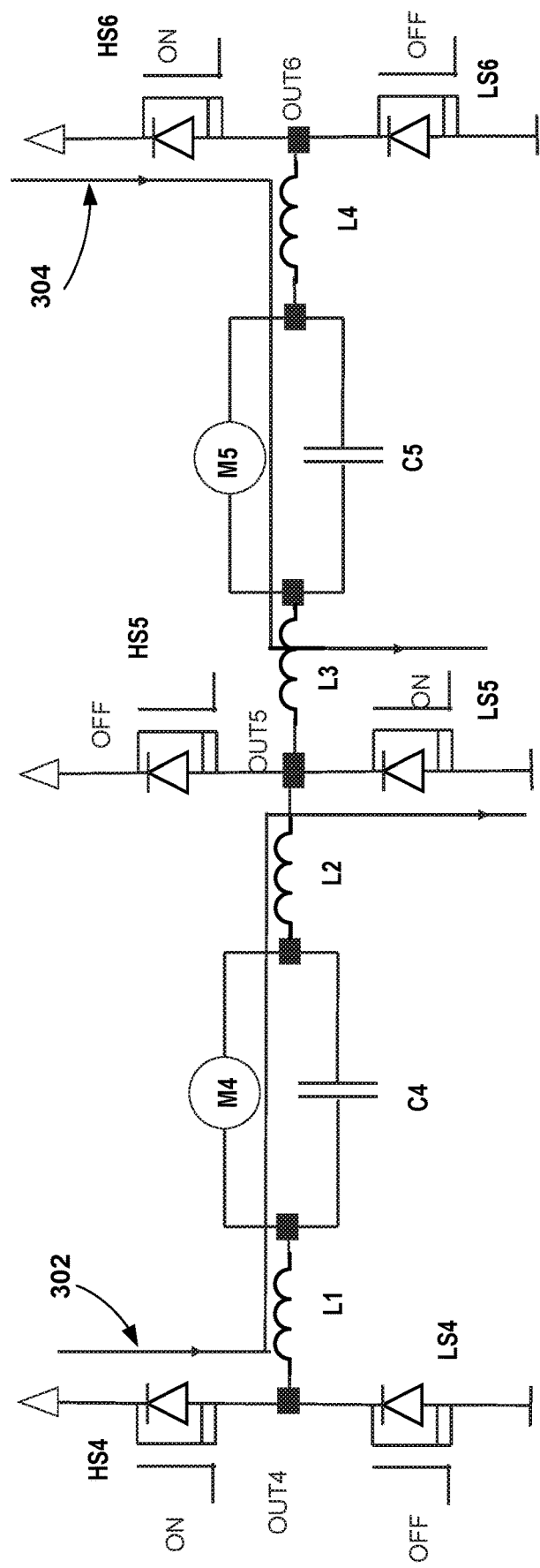
FIG. 3 is a schematic diagram illustrating an example of two DC motors that share at least one output terminal and half-bridge driver circuit.
Figure 4:
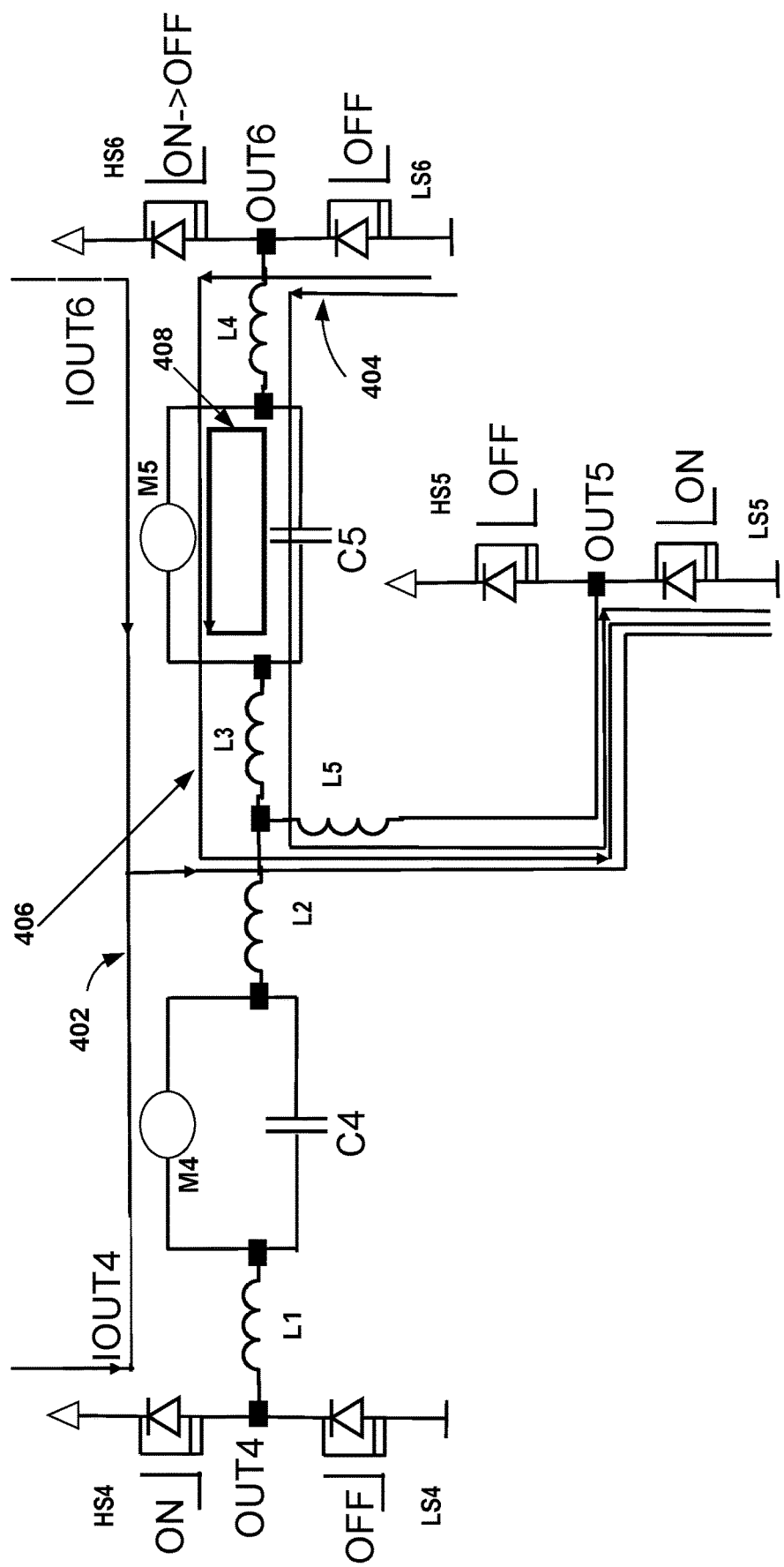
FIG. 4 is a schematic diagram illustrating an example of two DC motors that share at least one output terminal and electrical currents that affect operation of the shared half-bridge driver circuit.

FIG. 3 is a schematic diagram illustrating an example of two DC motors that share at least one output terminal and half-bridge driver circuit. The example of FIG. 3 continues the example arrangement of motors M4 and M5 and output terminals OUT4, OUT5, and OUT6 described above in relation to FIGS. 1 and 2. Each output terminal is connected to a half-bridge circuit. In the example of FIG. 4, high side switch HS4 connects between a power supply rail and output terminal OUT4. OUT4 connects to ground through low side switch LS4. Similarly, high side switch HS5 connects between the power supply rail and output terminal OUT5. OUT5 connects to ground through low side switch LS5. High side switch HS6 connects between the power supply rail and output terminal OUT6. OUT6 connects to ground through low side switch LS6.

As described above, motor M4 rotates in a first direction, e.g., clockwise because the logic circuitry of the motor controller circuit turns ON HS4 and turns ON LS5, connected to shared output terminal OUT5. Electric current 302 flows from the power supply rail to ground through HS4, motor M4 and LS5. In other examples, motor M4 may rotate in the opposite direction, e.g., counter-clockwise when LS4 is ON and HS5 is ON. All motors and driver circuits described above in relation to FIG. 1 may operate in a similar manner.

As motor M5 starts up, the logic circuitry may control HS6 to turn ON, causing additional current 304 to also flow through low side switch LS5. As shown in the example of FIG. 3, electric current 304 may also flow through stray inductance L4 and L3. The stray inductance may be a small inductance, e.g., approximately 1 micro Henry, that is inherent in the wires connecting the motors to the motor controller circuitry output terminals. Similarly electric current 302 may flow through inductance L1 and L2.

As described above in relation to FIGS. 1 and 2, the protection circuitry may cycle high side switch HS6 ON and OFF in OCR mode to avoid excessive current through HS6. Turning OFF HS6 causes motor capacitor C5 to discharge. Turning HS6 back ON may cause a current spike through both HS6 and LS5 caused by the recharge current through C5. To avoid an unnecessary shutdown from the recharge current spike, the protection circuitry may apply a blanking window, $t_{BLK\_OCOL3}$, to both HS6 and LS5.

The protection circuitry also may apply a blanking window, $t_{BLK\_OCOL3}$, to both half-bridge circuits associated with the shared half-bridge, whenever any switch of the shared half-bridge changes state. For the example of FIG. 3, during operation, if either switch of OUT5 turns ON or OFF, the pairing information causes the protection circuitry to apply a blanking window to both OUT4 and to OUT6.

FIG. 4 is a schematic diagram illustrating an example of two DC motors that share at least one output terminal and electrical currents that affect operation of the shared half-bridge driver circuit. The example of FIG. 4 continues the example of motors M4 and M5 described above in relation to FIGS. 1-3, and includes additional currents that may be present.

During $t_{OCR}$, shown above in FIG. 2, the current through OUT5 is defined by current 402 through OUT4 and OUT6. During $t_{OCR\_OFF}$, the current through OUT5 is defined by current 406 while HS6 is OFF and the current through motor M5 decays as shown in FIG. 2 along with current 404 from the series connection of LS6, stray inductance L4, L3 and L3, and discharge current from motor capacitor C5. Also, as HS6 is switched OFF, current 408 may circulate through motor M5 and motor capacitor C5.

Figure 5:
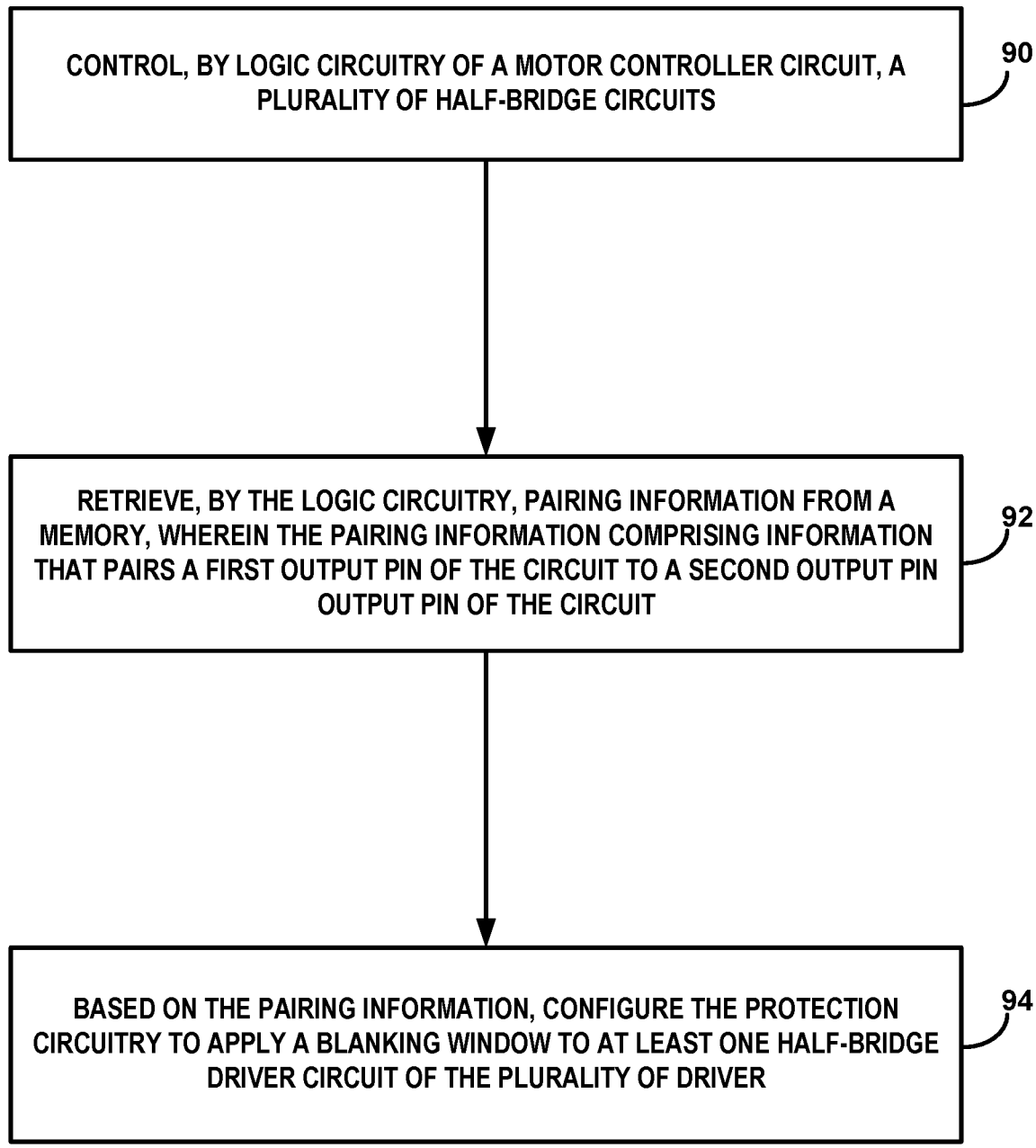
FIG. 5 is a flow chart illustrating an example operation of the motor controller circuit according to one or more techniques of this disclosure.

FIG. 5 is a flow chart illustrating an example operation of the motor controller circuit according to one or more techniques of this disclosure. The blocks of FIG. 5 will be described in terms of FIGS. 1 and 2, unless otherwise noted.

Logic circuitry 104 of motor controller circuit 102 may control a plurality of half-bridge circuits, e.g., half-bridge circuits 131-136 (90). As described above in relation to FIG. 1, motor controller circuit 102 includes a plurality of output terminals, e.g., OUT1-OUT-N, where the output terminals connect to a respective half-bridge driver circuit. Motor controller circuit 102 also includes protection circuitry 112 configured to be coupled to the plurality of half-bridge driver circuits, monitor the operation of the half-bridge circuits and protect motor controller circuitry 102 from possible damage.

Logic circuitry 104 may retrieve pairing information from memory 110 (92). The pairing information includes information that pairs, for example a first output pin of the circuit to a second output pin output pin of the circuit, based on the arrangement of the motors connected to the output pins.

Based on the pairing information, logic circuitry 104 may configure protection circuitry 112 to apply a blanking window, e.g., $t_{BLK\_OCOL3}$, to at least one half-bridge driver circuit of the plurality of driver circuits (94). As described above in relation to FIGS. 1-3, protection circuitry may apply the blanking window to both the transistors which remain ON during $t_{OCR\_OFF}$ and for the transistor which starts again in ON state when $t_{OCR\_OFF}$ ends.

In one or more examples, the functions described above may be implemented in hardware, software, firmware, or any combination thereof. For example, the various components of FIG. 1 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry," and "logic circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described.

The disclosure may also be described in terms of the following clauses.

Clause 1. A controller circuit comprising: a plurality of output terminals configured to be connected to a plurality of half-bridge circuits; protection circuitry, wherein the protection circuitry is configured to be coupled to the plurality of half-bridge driver circuits; a memory configured to store pairing information that pairs a first output pin of the circuit to a second output pin output pin of the circuit, and logic circuitry configured to: control the operation of the half-bridge driver circuits; retrieve the pairing information from the memory; and based on the pairing information, configure the protection circuitry to apply a blanking window to at least one half-bridge driver circuit of the plurality of driver circuits.

Clause 2. The controller circuit of clause 1, wherein the protection circuitry is configured to operate in an overcurrent recovery (OCR) mode, wherein during the OCR mode, the protection circuitry is configured to turn OFF and ON at least one switch of a first half-bridge driver circuit of the plurality of half-bridge driver circuits, and wherein the protection circuitry is configured to start the blanking window after turning ON the at least one switch during OCR mode.

Clause 3. The controller circuit of clauses 1 or 2, wherein the protection circuitry is configured to apply the blanking window to start simultaneously with turning ON the at least one switch during OCR mode.

Clause 4. The controller circuit of any of clause 1-3, wherein the logic circuitry is configured to receive a setup message, wherein the setup message includes at least pairing information that pairs a first output pin of the circuit to a second output pin output pin of the circuit, wherein the logic circuitry is configured to store the pairing information at the memory, and wherein the setup message is received from outside the circuit.

Clause 5. The controller circuit of any of clause 1-4, wherein the memory is configured to store pairing information that pairs a first output pin of the circuit to two or more other output pins of the circuit.

Clause 6. The controller circuit of any of clause 1-5, wherein, in response to a second output pin of the two or more other output pins operating in overcurrent recovery mode, the logic circuitry is configured to apply the blanking window to the first output pin paired with the second output pin.

Clause 7. The controller circuit of any of clause 1-6, wherein the at least one pair of output terminals is configured to connect to a capacitor; wherein the capacitor is connected between each output terminal of the at least one pair of output terminals; wherein the capacitor connects in parallel to the DC motor; wherein the half-bridge circuit associated with the output terminal is configured to carry charging current for the capacitor.

Clause 8. A system comprising: a plurality of direct current (DC) motors; a controller circuit comprising: a plurality of output terminals, wherein each output terminal of the plurality of output terminals is configured to connect to at least one DC motor of the plurality of DC motors, wherein the plurality of output terminal is configured to connect to a plurality of half-bridge driver circuits; protection circuitry, wherein the protection circuitry is configured to be coupled to the plurality of half-bridge driver circuits; a memory configured to store pairing information that pairs a first output pin of the circuit to a second output pin output pin of the circuit, and logic circuitry configured to: control the operation of the half-bridge driver circuits; retrieve the pairing information from the memory; and based on the pairing information, configure the protection circuitry to apply a blanking window to at least one half-bridge driver circuit of the plurality of driver circuits.

Clause 9. The system of clause 8, wherein the protection circuitry is configured to operate in an overcurrent recovery (OCR) mode, wherein during the OCR mode, the protection circuitry is configured to turn OFF and ON at least one switch of a first half-bridge driver circuit of the plurality of half-bridge driver circuits, and wherein the protection circuitry is configured to apply the blanking window to start after turning ON the at least one switch during OCR mode.

Clause 10. The system of clauses 8 or 9, wherein the protection circuitry is configured to apply the blanking window to start simultaneously with turning ON the at least one switch during OCR mode.

Clause 11. The system of any of clause 8-10, wherein the controller circuit is configured to receive a setup message, wherein the setup message includes at least pairing information that pairs a first output pin of the circuit to a second output pin output pin of the circuit, wherein the logic circuitry is configured to store the pairing information at the memory, and wherein the setup message is received from outside the circuit.

Clause 12. The system of any of clause 8-11, wherein each half-bridge circuit connected to the respective output terminal is configured to drive operation of the DC motor to which it is connected.

Clause 13. The system of any of clause 8-12, wherein the memory is configured to store pairing information that pairs a first output pin of the circuit to two or more other output pins of the circuit, and wherein, in response to a second output pin of the two or more other output pins operating in an overcurrent recovery mode, the logic circuitry is configured to apply the blanking window to the first output pin paired with the second output pin.

Clause 14. The system of any of clause 8-13, wherein the at least one pair of output terminals is configured to connect a capacitor; wherein the capacitor is connected between each output terminal of the at least one pair of output terminals; wherein the capacitor connects in parallel to the at least one DC motor; wherein the half-bridge circuit associated with the output terminal is configured to carry charging current for the capacitor.

Clause 15. The system of any of clause 8-14, wherein the plurality of DC motors comprises a first DC motor and a second DC motor, wherein the first DC motor connects to a first pair of output terminals, wherein the second DC motor connects to a second pair of output terminals, wherein the first DC motor and the second DC motor share at least one output terminal, and wherein the setup message comprises information describing the first pair of output terminals, the second pair of output terminals and the at least one shared output terminal.

Clause 16. The system of clause 15, wherein, in response to any switch for the at least one shared output terminal changing state, the logic circuitry is configured to apply the blanking window to all output terminals paired with the at least one shared output terminal.

Clause 17. A method comprising: controlling, by logic circuitry of a motor controller circuit, a plurality of half-bridge circuits, wherein the motor controller circuit comprises: a plurality of output terminals, wherein the plurality of output terminals is configured to connect to a plurality of half-bridge driver circuits; and protection circuitry, wherein the protection circuitry is configured to be coupled to the plurality of half-bridge driver circuits; retrieving, by the logic circuitry, pairing information from a memory, wherein the pairing information comprising information that pairs a first output pin of the circuit to a second output pin output pin of the circuit, based on the pairing information, configuring the protection circuitry to apply a blanking window to at least one half-bridge driver circuit of the plurality of driver circuits.

Clause 18. The method of clause 17, further comprising; operating, by the protection circuitry in an overcurrent recovery (OCR) mode, wherein during the OCR mode, turning OFF and turning ON at least one switch of a first half-bridge driver circuit of the plurality of half-bridge driver circuits, and applying, by the protection circuitry, the blanking window to start after turning ON the at least one switch during OCR mode.

Clause 19. The method of clauses 17 or 18, further comprising receiving, by the controller circuit, a setup message, wherein the setup message includes at least pairing information that pairs a first output pin of the circuit to a second output pin output pin of the circuit, wherein the logic circuitry is configured to store the pairing information at the memory, and wherein the setup message is received from outside the circuit.

Clause 20. The method of any of clause 17-19, wherein each output terminal of the plurality of output terminals is configured to connect to a direct current (DC) motor, and wherein each half-bridge circuit connected to the respective output terminal is configured to drive operation of the DC motor to which it is connected.

Clause 21. The method of any of clause 17-20, further comprising storing in the memory pairing information that pairs a first output pin of the circuit to two or more other output pins of the circuit, and in response to a second output pin of the two or more other output pins operating in an overcurrent recovery mode, applying, by the logic circuitry, the blanking window to the first output pin paired with the second output pin.

Various examples of the disclosure have been described. These and other examples are within the scope of the following claims.

What is claimed is:

1. A controller circuit comprising:
a plurality of output terminals configured to be connected to a plurality of half-bridge driver circuits;
protection circuitry, wherein the protection circuitry is configured to be coupled to the plurality of half-bridge driver circuits;
a memory configured to store pairing information that pairs a first output pin of the circuit to a second output pin of the circuit, and
logic circuitry configured to:
control operation of the half-bridge driver circuits;
retrieve the pairing information from the memory; and
based on the pairing information, configure the protection circuitry to apply a blanking window to at least one half-bridge driver circuit of the plurality of half-bridge driver circuits.

2. The controller circuit of claim 1,
wherein the protection circuitry is configured to operate in an overcurrent recovery (OCR) mode,
wherein during the OCR mode, the protection circuitry is configured to turn OFF and ON at least one switch of a first half-bridge driver circuit of the plurality of half-bridge driver circuits, and
wherein the protection circuitry is configured to start the blanking window after turning ON the at least one switch during OCR mode.

3. The controller circuit of claim 2, wherein the protection circuitry is configured to apply the blanking window to start simultaneously with turning ON the at least one switch during the OCR mode.

4. The controller circuit of claim 1,
wherein the logic circuitry is configured to receive a setup message,
wherein the setup message includes at least pairing information that pairs a first output pin of the circuit to a second output pin output pin of the circuit,
wherein the logic circuitry is configured to store the pairing information at the memory, and
wherein the setup message is received from outside the circuit.

5. The controller circuit of claim 2, wherein the memory is configured to store pairing information that pairs a first output pin of the controller circuit to two or more other output pins of the controller circuit.

6. The controller circuit of claim 5, wherein, in response to a second output pin of the two or more other output pins operating in overcurrent recovery mode, the logic circuitry is configured to apply the blanking window to the first output pin paired with the second output pin.

7. The controller circuit of claim 6,
wherein at least one pair of output terminals is configured to connect to a capacitor;
wherein the capacitor is connected between each output terminal of the at least one pair of output terminals;
wherein the capacitor connects in parallel to a DC motor;
wherein a particular half-bridge circuit associated with the output terminal is configured to carry charging current for the capacitor.

8. A system comprising:
a plurality of direct current (DC) motors;
a controller circuit comprising:
a plurality of output terminals, wherein each output terminal of the plurality of output terminals is configured to connect to at least one DC motor of the plurality of DC motors, wherein the plurality of output terminal is configured to connect to a plurality of half-bridge driver circuits;
protection circuitry, wherein the protection circuitry is configured to be coupled to the plurality of half-bridge driver circuits;
a memory configured to store pairing information that pairs a first output pin of the circuit to a second output pin output pin of the circuit, and
logic circuitry configured to:
control operation of the half-bridge driver circuits;
retrieve the pairing information from the memory; and
based on the pairing information, configure the protection circuitry to apply a blanking window to at least one half-bridge driver circuit of the plurality of half-bridge driver circuits.

9. The system of claim 8,
wherein the protection circuitry is configured to operate in an overcurrent recovery (OCR) mode,
wherein during the OCR mode, the protection circuitry is configured to turn OFF and ON at least one switch of a first half-bridge driver circuit of the plurality of half-bridge driver circuits, and
wherein the protection circuitry is configured to apply the blanking window to start after turning ON the at least one switch during OCR mode.

10. The system of claim 9, wherein the protection circuitry is configured to apply the blanking window to start simultaneously with turning ON the at least one switch during the OCR mode.

11. The system of claim 8,
wherein the controller circuit is configured to receive a setup message,
wherein the setup message includes at least pairing information that pairs a first output pin of the circuit to a second output pin of the controller circuit,
wherein the logic circuitry is configured to store the pairing information at the memory, and
wherein the setup message is received from outside the controller circuit.

12. The system of claim 8, wherein each half-bridge circuit connected to a respective output terminal is configured to drive operation of the DC motor to which it is connected.

13. The system of claim 8,
wherein the memory is configured to store pairing information that pairs a first output pin of the circuit to two or more other output pins of the controller circuit, and
wherein, in response to a second output pin of the two or more other output pins operating in an overcurrent recovery mode, the logic circuitry is configured to apply the blanking window to the first output pin paired with the second output pin.

14. The system of claim 8,
wherein at least one pair of output terminals is configured to connect a capacitor;
wherein the capacitor is connected between each output terminal of the at least one pair of output terminals;
wherein the capacitor connects in parallel to the at least one DC motor; wherein a particular half-bridge circuit associated the at least one pair of output terminals is configured to carry charging current for the capacitor.

15. The system of claim 8,
wherein the plurality of DC motors comprises a first DC motor and a second DC motor,
wherein the first DC motor connects to a first pair of output terminals,
wherein the second DC motor connects to a second pair of output terminals,
wherein the first DC motor and the second DC motor share at least one output terminal, and
wherein a setup message comprises information describing the first pair of output terminals, the second pair of output terminals and the at least one shared output terminal.

16. The system of claim 15, wherein, in response to any switch for the at least one shared output terminal changing state, the logic circuitry is configured to apply the blanking window to all output terminals paired with the at least one shared output terminal.

17. A method comprising:
controlling, by logic circuitry of a motor controller circuit, a plurality of half-bridge circuits, wherein the motor controller circuit comprises:
 a plurality of output terminals, wherein the plurality of output terminals is configured to connect to a plurality of half-bridge driver circuits; and
 protection circuitry, wherein the protection circuitry is configured to be coupled to the plurality of half-bridge driver circuits;
retrieving, by the logic circuitry, pairing information from a memory, wherein the pairing information comprises information that pairs a first output pin of the motor controler circuit to a second output pin output pin of the motor controler circuit; and
based on the pairing information, configuring the protection circuitry to apply a blanking window to at least one half-bridge driver circuit of the plurality of driver circuits.

18. The method of claim 17, further comprising;
operating, by the protection circuitry in an overcurrent recovery (OCR) mode,
wherein during the OCR mode, turning OFF and turning ON at least one switch of a first half-bridge driver circuit of the plurality of half-bridge driver circuits, and
applying, by the protection circuitry, the blanking window to start after turning ON the at least one switch during OCR mode.

19. The method of claim 17, further comprising receiving, by the motor controller circuit, a setup message,
wherein the setup message includes at least pairing information that pairs a first output pin of the circuit to a second output pin output pin of the circuit,
wherein the logic circuitry is configured to store the pairing information at the memory, and
wherein the setup message is received from outside the circuit.

20. The method of claim 17,
wherein each output terminal of the plurality of output terminals is configured to connect to a direct current (DC) motor, and
wherein each half-bridge circuit connected to the respective output terminal is configured to drive operation of the DC motor to which it is connected.

21. The method of claim 17, further comprising
storing in the memory pairing information that pairs a first output pin of the motor controller circuit to two or more other output pins of the motor controller circuit, and
in response to a second output pin of the two or more other output pins operating in an overcurrent recovery mode, applying, by the logic circuitry, the blanking window to the first output pin paired with the second output pin.

* * * * *